United States Patent
Brock et al.

Patent Number: 5,568,904
Date of Patent: Oct. 29, 1996

[54] STEERED PERIGEE VELOCITY AUGMENTATION

[75] Inventors: J. Kurt Brock; Darren R. Stratemeier, both of Mountain View; Eugene L. Williams, San Jose, all of Calif.

[73] Assignee: Space Systems/Loral, Inc., Palo Alto, Calif.

[21] Appl. No.: 937,957

[22] Filed: Aug. 28, 1992

[51] Int. Cl.$^6$ .............................. B64G 1/24; B64G 1/26; F02K 1/00; F02K 7/02
[52] U.S. Cl. ...................... 244/169; 244/158 R; 244/164
[58] Field of Search .................................... 244/158, 164, 244/169, 172

[56] References Cited

U.S. PATENT DOCUMENTS

| | | | |
|---|---|---|---|
| 3,215,365 | 11/1965 | Wyatt et al. | 244/169 |
| 4,741,502 | 5/1988 | Rosen | 244/172 |
| 4,896,848 | 1/1990 | Ballard et al. | 244/172 |
| 4,943,014 | 7/1990 | Harwood et al. | 244/169 |
| 5,082,211 | 1/1992 | Werka | 244/164 |

*Primary Examiner*—Andres Kashnikow
*Assistant Examiner*—Virna Mojica
*Attorney, Agent, or Firm*—Kenneth W. Float; Anthony W. Karambelas

[57] ABSTRACT

A satellite perigee velocity augmentation method wherein a satellite is steered throughout the perigee velocity augmentation maneuver such that its thrust vector is always oriented approximately opposite to the direction of motion of the satellite. The satellite is pitched around a predetermined axis (e.g. the Y-axis) such that the thrust vector is always pointing approximately opposite to the direction of motion of the satellite. The satellite is steered during the perigee velocity augmentation maneuver in order to achieve the desired attitude wherein the thrust vector is always oriented approximately opposite to the direction of motion of the satellite is accomplished by pitching the satellite around the predetermined axis such that the thrust vector is always pointing approximately opposite to the direction of motion of the satellite. By steering the satellite in accordance with the present perigee velocity augmentation method, overall efficiency achieved is increased. This increased efficiency allows a satellite of greater mass to reach geosynchronous orbit, since less fuel is required to perform the maneuvers.

3 Claims, 3 Drawing Sheets

STEERED PERIGEE VELOCITY AUGMENTATION

BACKGROUND

The present invention relates generally to satellite maneuvering methods, and more particularly, to a method of perigee velocity augmentation that provides for maneuvering a relatively heavy satellite and raising the apogee point of an elliptical transfer orbit to geosynchronous altitude.

Because of the ever-increasing mass of geostationary satellites, these satellites are delivered into subsynchronous transfer orbits due to limited launch vehicle capability. That is, the initial orbits of the satellite has a low perigee altitude (200–300 kilometers) and an apogee radius that is below the synchronous radius value of 42,164 kilometers. In order to raise the apogee radius to its synchronous value, perigee velocity augmentation is employed. Perigee velocity augmentation involves firing satellite thrusters in the vicinity of orbit perigee to raise the apogee of the orbit to the synchronous radius. After this is achieved, normal orbit raising operations are undertaken.

One previous approach to perigee velocity augmentation is to orient the satellite into the correct attitude such that its thrust vector is oriented directly opposite to the direction of motion of the satellite exactly at the satellite's perigee point. The satellite maintains this inertial attitude for the entirety of the maneuver. This approach to perigee velocity augmentation is adequate but is not very efficient.

Several approaches to perigee velocity augmentation are described in a paper entitled "Perigee Velocity Augmentation for Synchronous Mission", by E. L. Williams, published in the proceedings of the AIAA 20th Aerospace Sciences Meeting, Jan. 11–14, 1982. This paper discusses perigee velocity augmentation in general and describes three augmentation techniques known as "perigee/perigee", "perigee/apogee" and the "fire in the hole" techniques. Each technique is described in detail, and analysis is provided, as it relates to a particular launch vehicle and satellite configuration. The content of this paper is incorporated herein in its entirety by reference.

Therefore, it is an objective of the present invention to provide for a method of perigee velocity augmentation that is relatively efficient, and wherein this increased efficiency allows a satellite of greater mass to be delivered into geosynchronous orbit.

SUMMARY OF THE INVENTION

In order to achieve the above objectives, the present invention is a satellite maneuvering method comprising perigee velocity augmentation wherein a satellite is steered throughout the perigee velocity augmentation maneuver such that its thrust vector is always oriented approximately opposite to the direction of motion of the satellite, not just at the perigee point as in done in the prior art. The satellite is pitched around a predetermined axis (for example, Y-axis) such that the thrust vector is always pointing nearly opposite to the direction of motion of the satellite.

By steering the satellite in accordance with the present perigee velocity augmentation maneuver, overall efficiency achieved is increased. This increased efficiency allows a satellite of greater mass to reach geosynchronous orbit, since less fuel is required to perform the maneuvers. With the ever increasing mass of present and future geosynchronous communications satellites, the steered perigee velocity augmentation maneuver of the present invention is a necessary and valuable improvement to the art.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
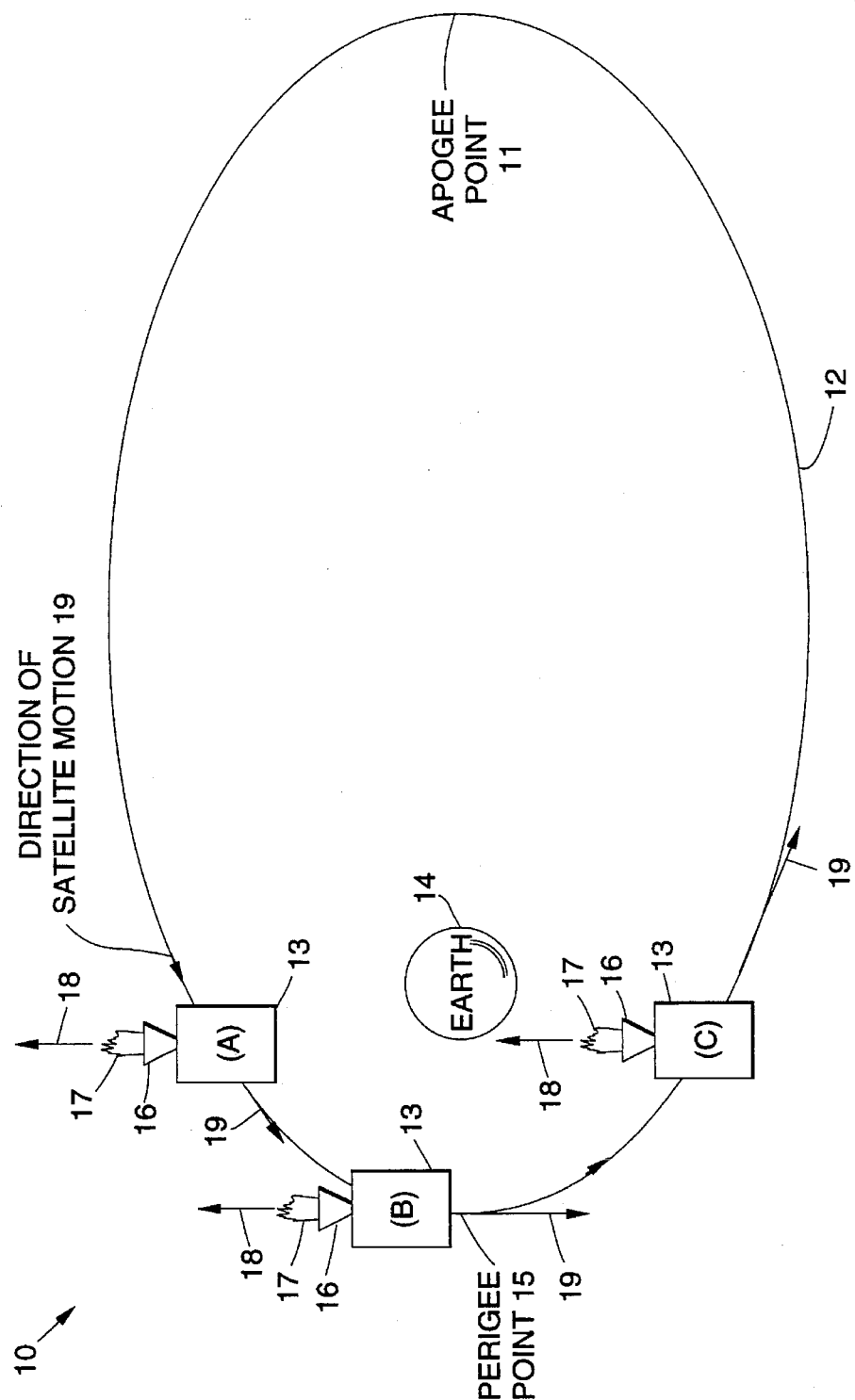
FIG. 1 illustrates a prior art perigee velocity augmentation method.

Referring to the drawing figures, FIG. 1 illustrates a prior art perigee velocity augmentation method 10. The prior art perigee velocity augmentation method 10 is used to raise the apogee point 11 of the elliptical transfer orbit 12 to geosynchronous altitude value of 35,786 kilometers. The satellite 13 is launched from earth 14 by means of a conventional launch vehicle (not shown) and injected into the elliptical transfer orbit 12. The elliptical transfer orbit 12 has a perigee point 15 and an apogee point 11. The elliptical transfer orbit 12 has an apogee altitude that is below the desired geosynchronous value of 35,786 kilometers. The previous perigee velocity augmentation method 10 is used to raise the apogee point 11 of the elliptical transfer orbit 12 to the desired geosynchronous altitude value of 35,786 kilometers as is shown in FIG. 1, while keeping the orientation of the satellite 13 in substantially the same direction (inertially fixed) during the entire maneuver from positions (A) through (C).

More particularly, the satellite 13 has a thruster 16, such as is provided by a conventional liquid propulsion system, for example. The thruster 16 is conventionally employed by the satellite 13. In the conventional perigee velocity augmentation method 10, the thruster 16 is fired, illustrated by flames 17 emanating from the aft end of the thruster 16, beginning at position (A), ending at position (C) and centered about the augmentation burn point (position (B)). The orientation of the satellite 13 is never changed during the entire maneuver 10 from point (A) to point (C).

In the conventional method 10, the satellite 13 is oriented into an attitude wherein its thrust vector 18 is oriented at all times at a direction that is approximately opposite to the direction of satellite motion 19 at the perigee point 15. The satellite 13 maintains this inertial attitude for the entirety of the maneuver 10 from point (A) to point (C). However, it has been determined that this approach to perigee velocity augmentation is adequate but not very efficient in terms of propellant or ultimate satellite (payload) capacity.

Figure 2:
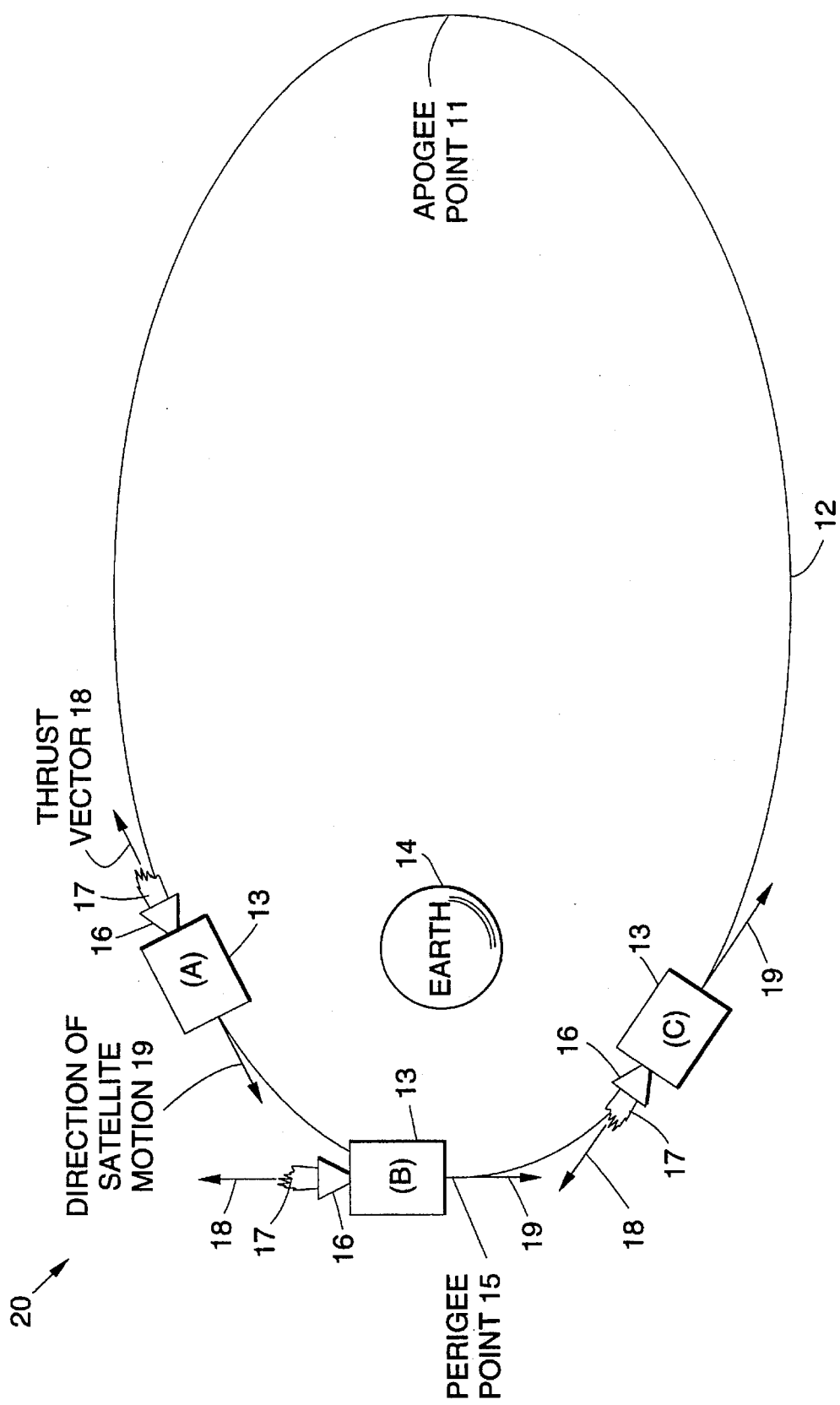
FIG. 2 illustrates a steered perigee velocity augmentation method in accordance with the principles of the present invention.

In order to overcome the limitations of the above-described conventional method 10, FIG. 2 illustrates a steered perigee velocity augmentation method 20 in accordance with the principles of the present invention. The method 20 is used to raise the apogee point 11 of the elliptical transfer orbit 12 to the geosynchronous altitude of 35,786 kilometers. As with the conventional method 10, the satellite 13 is launched from the earth 14 by the conventional launch vehicle (not shown) and injected into the elliptical transfer orbit 12 with an apogee altitude that is below the desired geosynchronous value of 35,786 kilometers.

In order to maneuver the satellite 13 in accordance with the steered perigee velocity augmentation method 20 of the present invention, during the perigee velocity augmentation maneuver, the satellite 13 is oriented with an attitude such that the thrust vector 18 is oriented approximately opposite to the direction of satellite motion 19. During the maneuver, the thruster 16 is fired, illustrated by the flames 17 emanating from the aft end of the thruster 16, beginning at position (A), ending at position (C), and centered about the augmentation burn point (position (B)). The satellite 13 is steered throughout the entire maneuver (position (A) through (C)) such that its thrust vector 18 is always oriented approximately opposite to the direction of satellite motion 19.

The present method 20 may employ any conventional perigee velocity augmentation maneuver, such as those discussed in the paper cited in the Background section. In particular, these maneuvers include the three augmentation techniques known as "perigee/perigee", "perigee/apogee" and the "fire in the hole" techniques.

Steering the satellite 13 to achieve the desired attitude wherein the thrust vector 18 is always oriented approximately opposite to the direction of satellite motion 19 is accomplished by pitching the satellite 13 around a predetermined axis (Y-axis, for example) such that the thrust vector 18 is always pointing approximately opposite to the direction of satellite motion 19.

Figure 3:
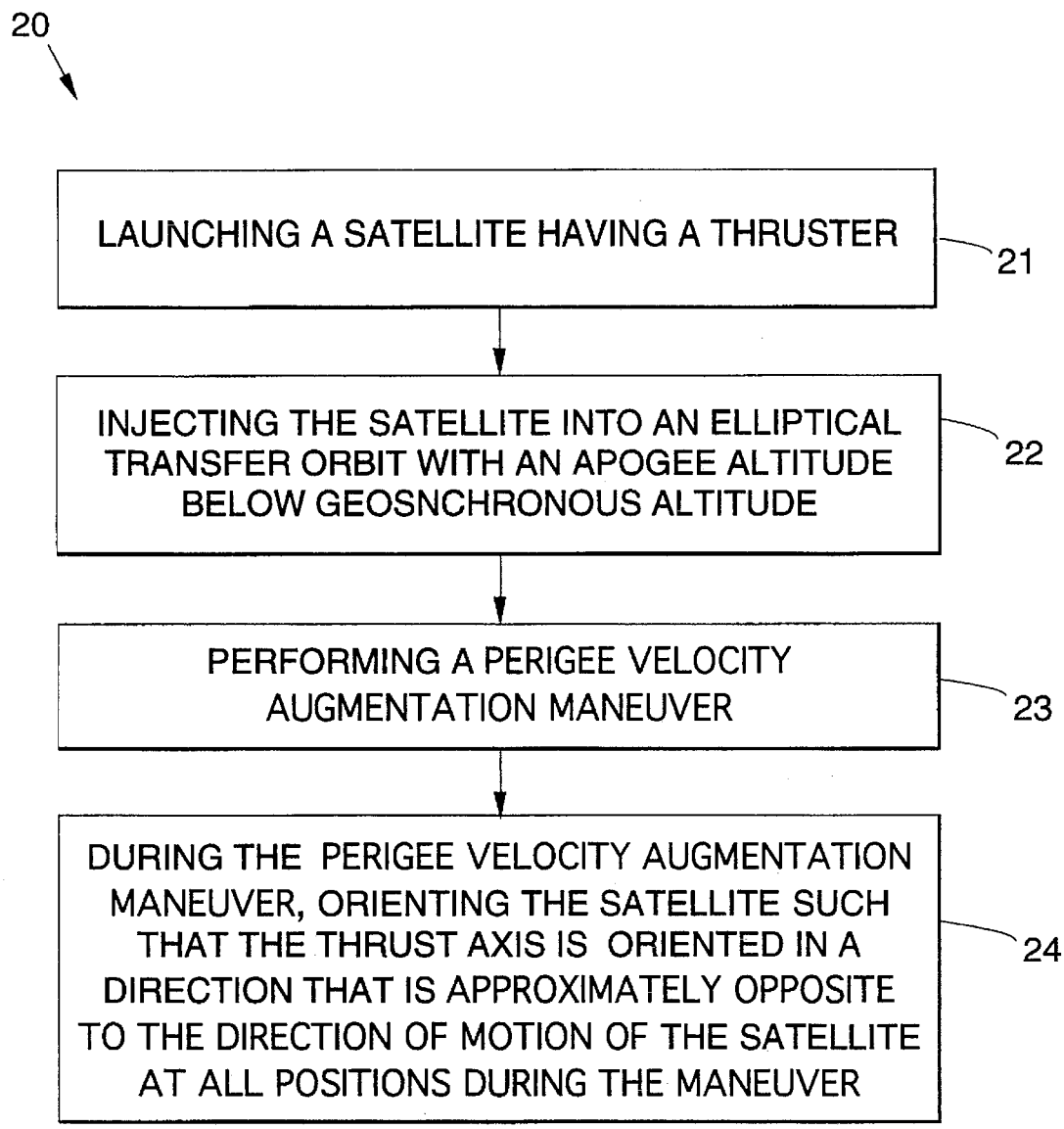
FIG. 3 is a flow chart illustrating the details of the steered perigee velocity augmentation method in accordance with the principles of the present invention.

For the purposes of completeness of this disclosure, FIG. 3 is a flow chart illustrating the steered perigee velocity augmentation method 20 in accordance with the principles of the present invention. The method 20 comprises the following steps. Launching a satellite 13 having a thruster 16, indicated by box 21. Injecting the satellite 13 into an elliptical transfer orbit 12 with an apogee point 11 below geosynchronous altitude (35,786 kilometers), indicated by box 22. Causing the satellite 13 to perform a perigee velocity augmentation maneuver, indicated by box 23. During the perigee velocity augmentation maneuver, orienting the satellite 13 such that its thrust axis is oriented in a direction that is approximately opposite to the direction of motion 19 of the satellite 13 at all positions during the maneuver, indicated by box 24. The step of properly orienting the satellite 13 during the maneuver comprises pitching the satellite 13 around a predetermined axis (its Y-axis, for example) such that the thrust vector is always pointing approximately opposite to the direction of satellite motion 19.

Thus, there has been described a new and improved perigee velocity augmentation method that raises the apogee point of an elliptical transfer orbit to geosynchronous altitude. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A perigee velocity augmentation method for raising the apogee point of an elliptical transfer orbit of a satellite to synchronous altitude, said method comprising the steps of:

launching a satellite having a thruster;

injecting the satellite into a predetermined elliptical transfer orbit having an apogee altitude that is below geosynchronous altitude;

causing the satellite to perform a perigee velocity augmentation. maneuver, and during the perigee velocity augmentation maneuver, orienting the satellite such that the thruster is oriented in a direction that is approximately opposite to the direction of motion of the satellite at all positions during the maneuver.

2. The method of claim 1 wherein the step of orienting the satellite comprises pitching the satellite around a predetermined axis such that its thrust vector is always pointing approximately opposite to the direction of motion of the satellite.

3. A perigee velocity augmentation method for raising the apogee point of an elliptical transfer orbit of a satellite to synchronous altitude, said method comprising the steps of:

launching a satellite having a thruster;

injecting the satellite into a predetermined elliptical transfer orbit having an apogee altitude that is below geosynchronous altitude;

causing the satellite to perform a perigee velocity augmentation maneuver, and during the perigee velocity augmentation maneuver, pitching the satellite around a predetermined axis such that the thruster is oriented in a direction that is approximately opposite to the direction of motion of the satellite at all positions during the maneuver.

\* \* \* \* \*